(12) United States Patent
Miller

(10) Patent No.: US 6,854,499 B2
(45) Date of Patent: Feb. 15, 2005

(54) PROCESS FOR MANUFACTURING RESIN-BASED COMPOSITE MATERIAL

(75) Inventor: Lester D. Miller, Ligonier, IN (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 170 days.

(21) Appl. No.: 09/997,893

(22) Filed: Nov. 30, 2001

(65) Prior Publication Data

US 2003/0102069 A1 Jun. 5, 2003

(51) Int. Cl.$^7$ .............................................. B32B 31/00
(52) U.S. Cl. ..................... 156/500; 156/510; 156/580
(58) Field of Search ................................ 156/510, 500, 156/580

(56) References Cited

U.S. PATENT DOCUMENTS

| | | | |
|---|---|---|---|
| RE24,804 E | | 3/1960 | Shorts |
| 2,927,623 A | | 3/1960 | Huisman et al. |
| 2,969,301 A | * | 1/1961 | Finger ..................... 156/183 |
| 3,077,000 A | | 2/1963 | Husiman et al. |
| 4,082,882 A | * | 4/1978 | Weinstein et al. ........... 156/285 |
| 4,091,142 A | * | 5/1978 | Elmore et al. ................. 156/78 |
| 4,287,663 A | * | 9/1981 | Newbold, Jr. ................. 29/611 |
| 4,963,408 A | | 10/1990 | Huegli |
| 5,135,793 A | | 8/1992 | Socha |
| 5,498,460 A | | 3/1996 | Tingley |
| 6,755,633 B2 | * | 6/2004 | Miller ........................ 425/64 |

OTHER PUBLICATIONS

Magnum Venus Products "MVP Company History" internet website page at http://www.mvpind.com/history.htm, Jan. 2004.*
Rivers, Ron, Venus–Gusmer Ships Turnkey Facility For Reinforced Plastic Trailer Panels.
Miller, Jim, Fabwel Always On The Lookout For Acquisitions, The Truth Business Report, Jan. 24, 1995.

* cited by examiner

Primary Examiner—Jeff H. Aftergut
(74) Attorney, Agent, or Firm—Ingar R. Eckert; James J. Dottavio

(57) ABSTRACT

An apparatus for manufacturing fiberglass-reinforced sheet is shown as including a feed mechanism feeding a sheet, whereby the sheet forms the upper mold surface for the fiberglass-reinforced sheets. The fed sheet moves longitudinally through a gel coating sprayer, and through applicators to apply resin in fiberglass. An automatic roller mechanism rolls the fiberglass strands into the resin and an automatic pressure mechanism applies pressure to wooden sheets placed on top of the fiberglass strands to form continuously fed completed sheet.

26 Claims, 12 Drawing Sheets

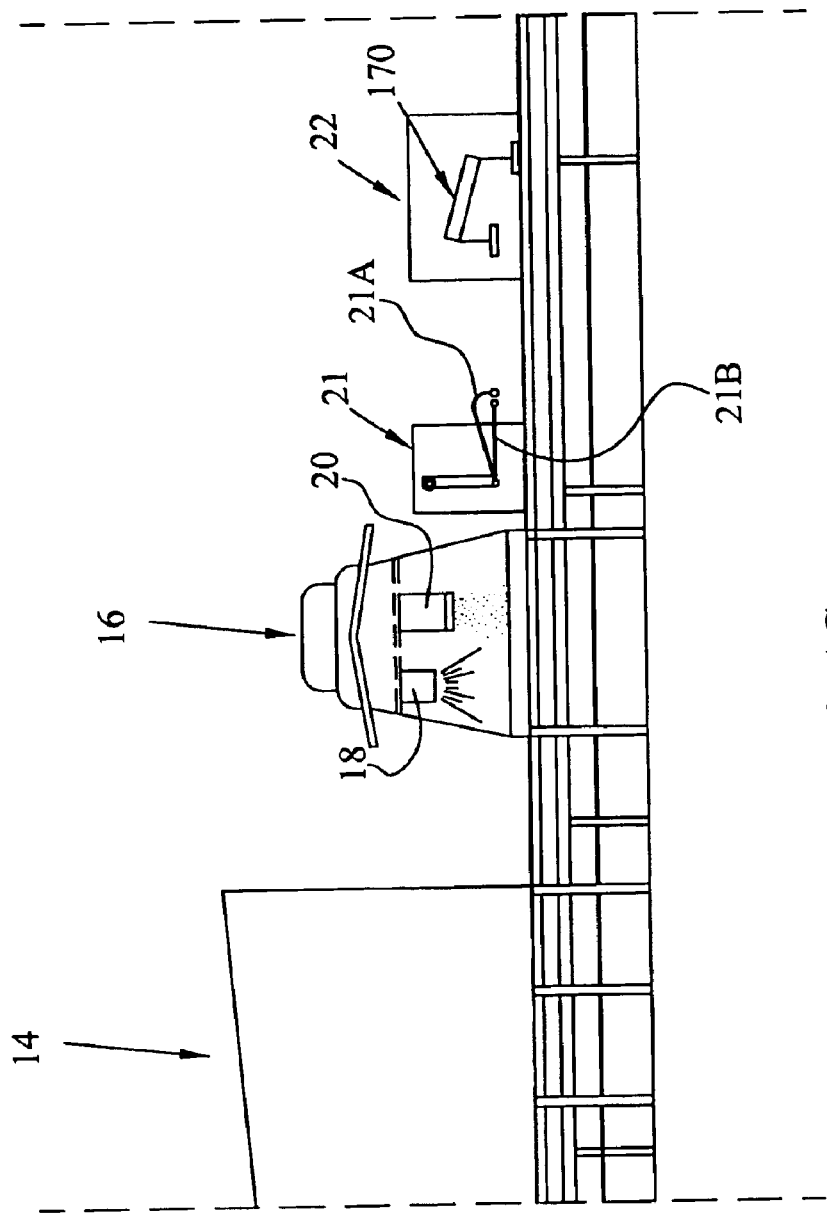

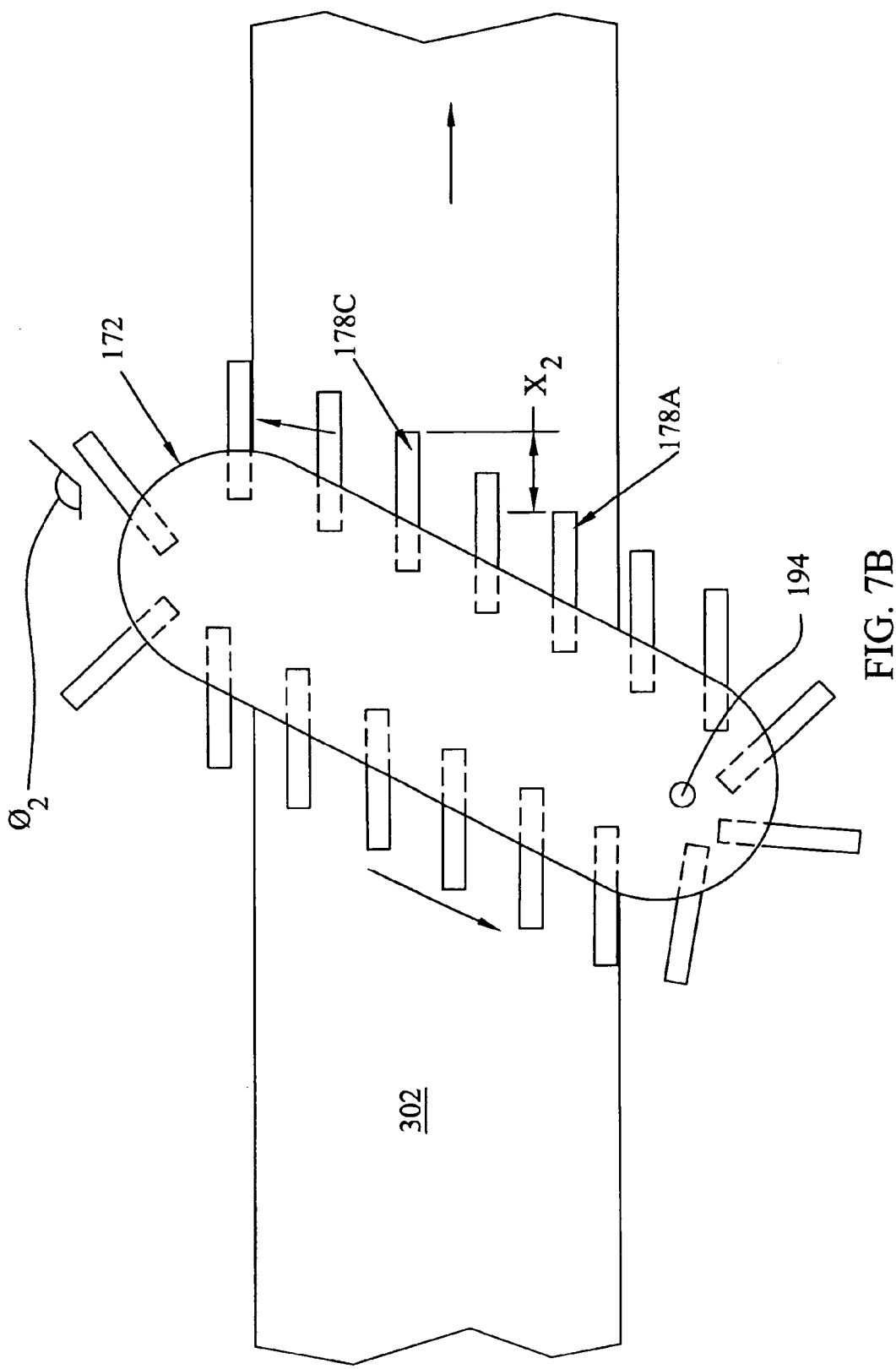

PROCESS FOR MANUFACTURING RESIN-BASED COMPOSITE MATERIAL

TECHNICAL FIELD

The subject application relates to a method and apparatus for the manufacture of fiber-reinforced panels.

BACKGROUND OF THE INVENTION

It is commonplace in the recreational vehicle business to use glass fiber-reinforced wall panels for the exterior surface of the recreational vehicle. These wall panels vary in widths up to, and including, dimensions from 2.4 to 3 meters (8 to 10 feet), and can have a length as long as 12 meters (40 ft.) or more. While the composite material from which the panels are made provides an adequate material for the recreational vehicle side walls, the presently utilized equipment for manufacturing the composite material invariably may emit VOCs, both within the facility, as well as that which may be exhausted to atmosphere.

The process of making the composite material first begins with use of an elongate mold. The mold is somewhat larger than the panels to be made, but large enough to accommodate the 3×12 meter (10×40 ft.) panels. The upper surface is a finished surface to provide a substantially flat and smooth surface, as it is this surface which forms the exterior surface of the panels to be made.

The mold is first sprayed with a coating known as a gel coating, which cures to form a high gloss exterior surface for the panel. Once cured, a resin and fiberglass are placed on the backside of the gel coating, and then a plurality of panels of hard board (such as luan panels) are positioned side by side on top of the fiberglass. A vacuum bag is then placed over the top of the panels and a slight vacuum is introduced which draws resin into the luan panels to form a finished product. The completed product is then pulled off of the mold and cut and trimmed to the proper size.

One method of applying the gel coating is to maintain the elongate mold in a stationary fashion, and move the gel coating sprayer longitudinally along rails and spray the entire length of the elongate mold. While this provides for an excellent layer of gel coating on the mold, due to the movement of the sprayer, capturing the fumes of the gel coating can be difficult. Furthermore, as maintenance of the molds is required, the molds are moved into and out of their various positions by way of an overhead crane, which due to the size of the elongate mold, can be a dangerous operation.

The object of the invention is to overcome the shortcomings of the prior art.

SUMMARY OF THE INVENTION

The objects of the invention have been accomplished by providing an apparatus for manufacturing glass fiber-reinforced sheet, comprising an upper movable surface being arranged in a longitudinal manner; a feed mechanism to continuously feed sheet onto the upper movable surface, a spray mechanism to spray a first outer coat of material onto the moving sheet, at least one dispensing mechanism to dispense resin over a layer of first outer coat, at least one applicator mechanism to apply fiber strands over the resin, a loading area whereby sheet panels may be positioned over the fiber strands, and a mechanism to draw resin applied to the sheet panels into the sheet panels to form a rigid composite material.

In a preferred embodiment of the invention, the upper movable surface is defined by a continuous loop of individual links. The links are elongate in width and connect to adjacent links along their front and rear edges. The apparatus further comprises a rail member positioned below the links defining a reference surface, and the links have a lower foot portion which registers with the links to define a horizontal plane on the upper movable surface. Each foot portion has a wear bar comprised of a low friction surface which slides relative to the reference surface.

Also preferably, the drawing mechanism is a pressure application mechanism, and is comprised of a second continuous loop of individual links, positioned in a spaced apart position from the first continuous loop.

The sheet is comprised of a roll of sheet material of high tensile strength, and a take up roller is also included to roll up the sheet material at the opposite end. The apparatus further comprises a roller table adjacent the take up roller, whereby finished fiberglass-reinforced sheet may be continuously fed onto the roller table.

In another embodiment of the invention, an apparatus for manufacturing fiberglass-reinforced sheet, comprises a mold surface being arranged in a longitudinal manner, onto which the fiberglass-reinforced sheet may be formed, a spray mechanism to spray a first outer coat of material onto the mold surface, at least one dispensing mechanism to dispense resin over a layer of first outer coat, at least one applicator mechanism to apply fiber strands over the resin, and an automatic roller mechanism which performs transverse rolling patterns across the mold surface.

In a preferred embodiment of the invention, the automatic roller mechanism is comprised of at least one roller which is driven in a continuous loop in a direction transverse to the longitudinal direction. The mold surface is preferably movable in the longitudinal direction. The roller mechanism is profiled to move the at least one roller in a direction, such that the roller has a transverse velocity component and a longitudinal velocity component, whereby the longitudinal velocity component is equal to a longitudinal velocity of the moving mold surface. The roller mechanism is comprised of a driven chain loop guided around a chain guide, and the roller is attached to and driven by the chain loop. The chain guide is movable to various angles to vary the angle of the chain guide relative to the longitudinal direction. Preferably, a plane of the chain guide is tipped relative to a plane of the mold surface. Also preferably, a plurality of rollers are attached to and driven by the chain loop.

In a preferred embodiment of the invention, the movable mold surface is defined by a roll of film together with a feed mechanism to feed the film at a first end, and a take up roller at a second end. A movable support surface is positioned beneath the movable mold surface. The movable mold surface and the movable support surface are moved together at substantially the same speeds. The movable support surface is defined by a continuous loop of individual links. Preferably, a rail member is positioned below the links defining a reference surface, and the links have a lower foot portion which registers with the links to define a horizontal plane.

In yet another embodiment of the invention, a method for manufacturing fiberglass-reinforced sheet, comprises the steps of feeding a sheet of material over a support surface, applying a first outer coat of material to the sheet, applying at least a first coat of resin over the first out coat, applying fiber strands over the resin, positioning wood reinforcement sheets over the fiberglass, and forcing the resin into the wood reinforcement sheets to form a composite material.

A preferred method further comprises the step of moving the support surface at the same speed as the sheet of material. The sheet of material is taken up by a take up roller, and a continuous sheet of fiberglass-reinforced sheet is moved tangentially away from the sheet of material. A preferred method also includes the step of rolling the fiber strands into the resin. The rolling is generally transverse to the direction of feed. The rolling is accomplished by moving at least one roller in a direction, such that the roller has a transverse velocity component and a longitudinal velocity component, whereby the longitudinal velocity component is equal to the longitudinal velocity of the sheet feed. Preferably, the rolling is accomplished by the use of a plurality of rollers.

BRIEF DESCRIPTION OF THE DRAWINGS

FIGS. 1A–1E show a side plan view of the continuous mold apparatus of the subject invention;

FIGS. 7A and 7B show diagrammatical views of two various positions of the fiberglass roller mechanism of FIG. 5 with different linear speeds of the continuous mold apparatus.

DETAILED DESCRIPTION AND PREFERRED EMBODIMENTS OF THE INVENTION

Figure 1A:
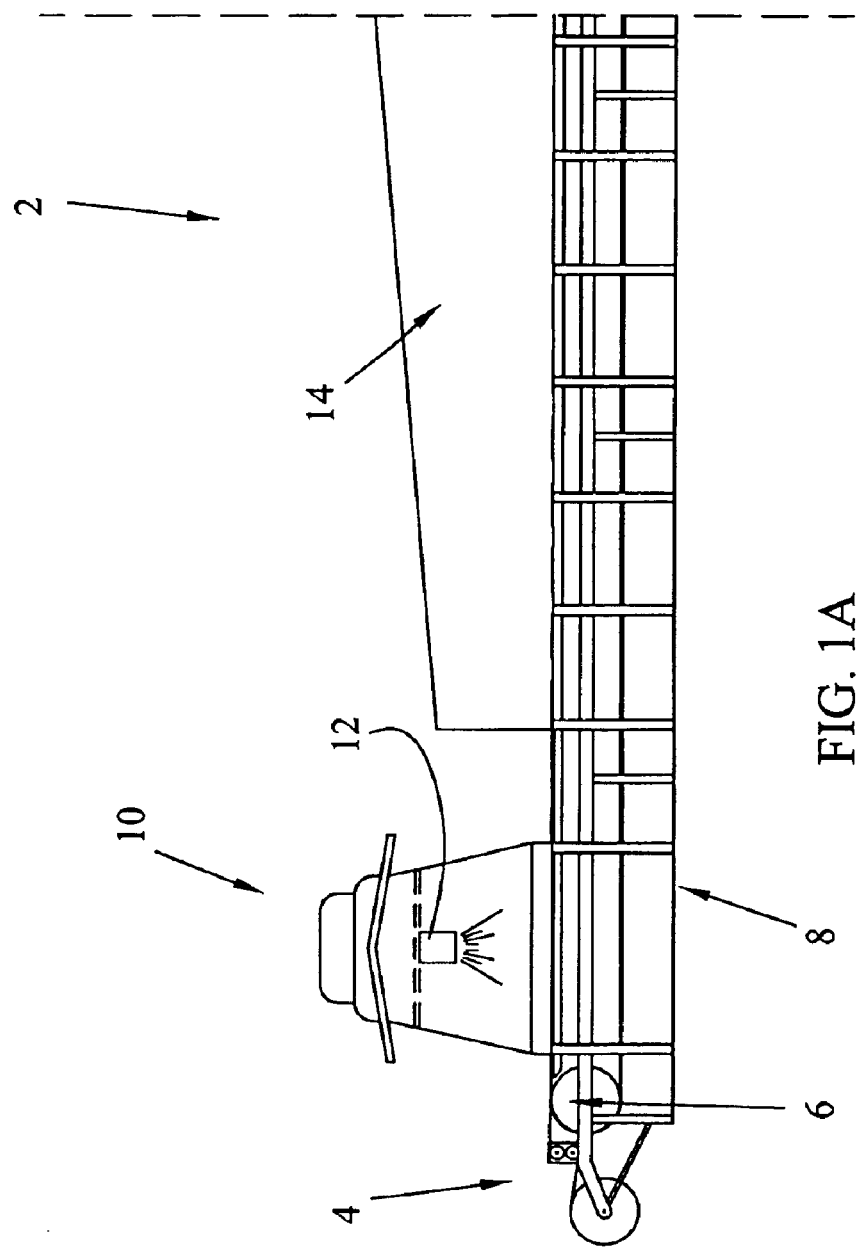
Figure 1B:
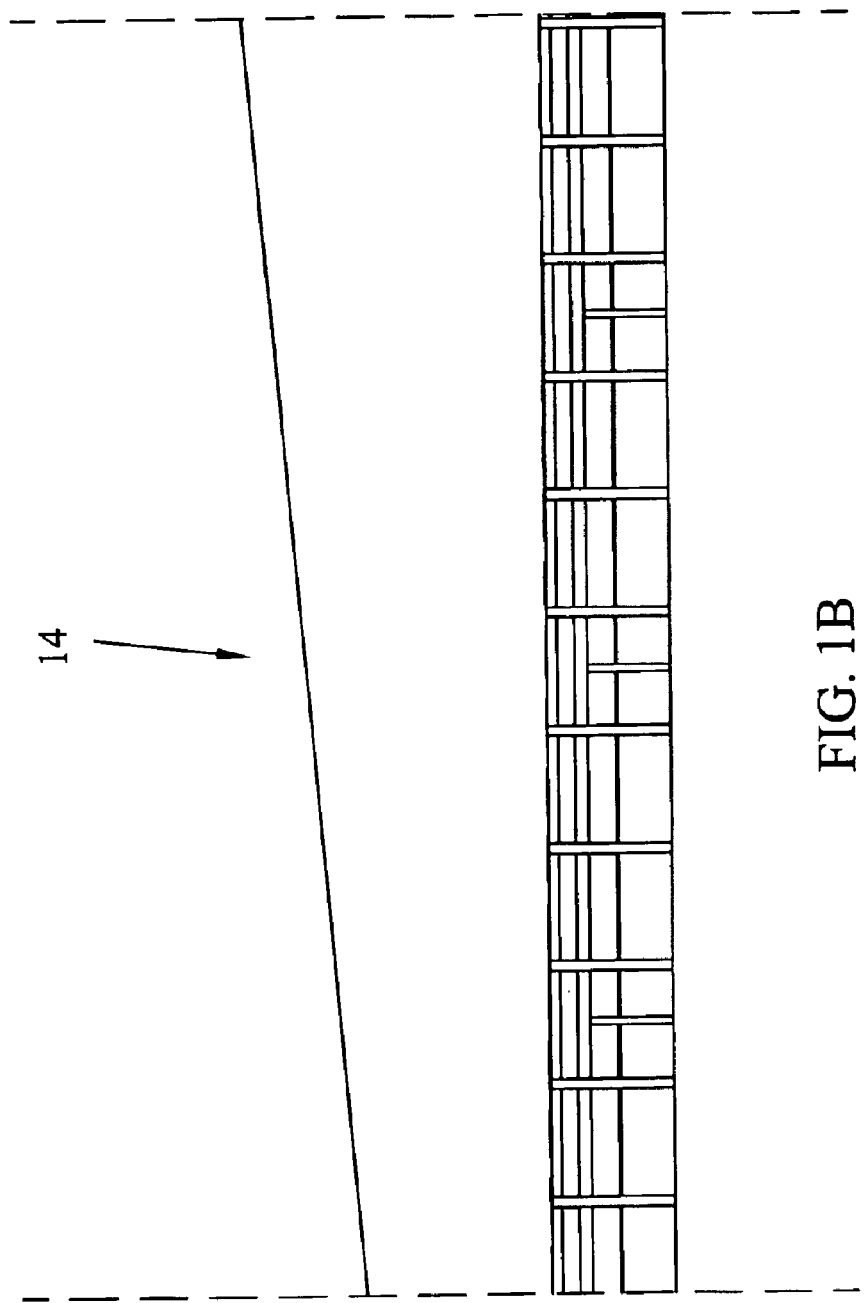
Figure 1D:
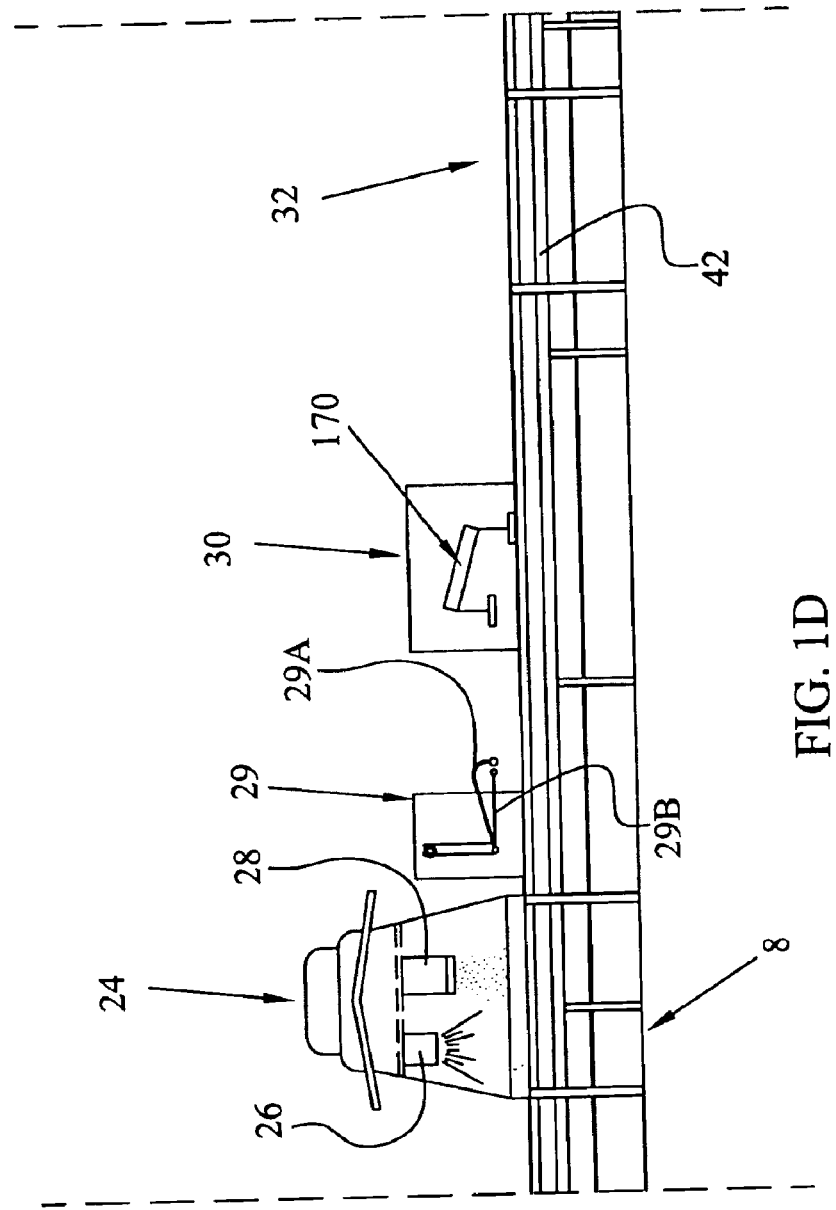
Figure 1E:
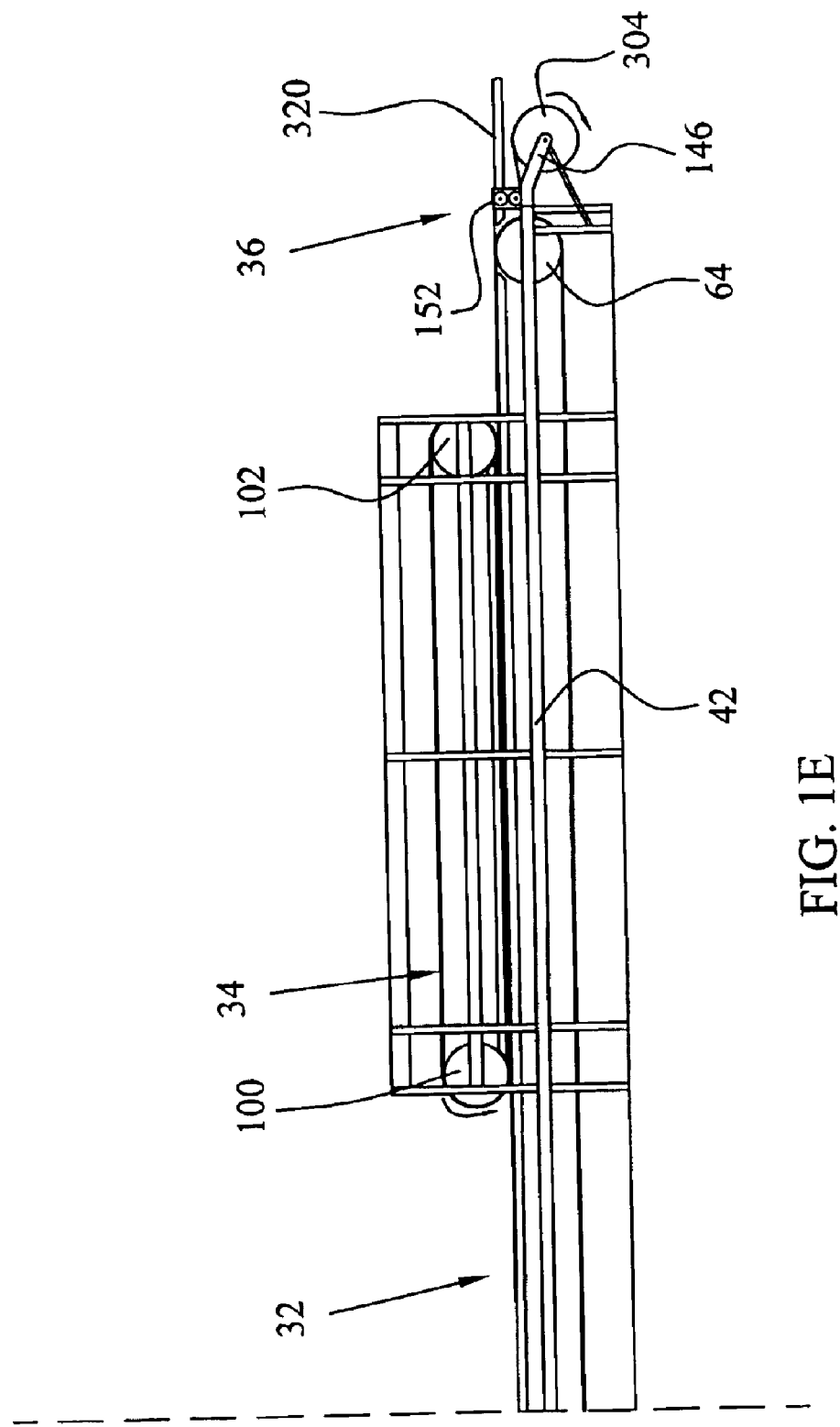

With reference now to FIG. 1A, a continuous molding apparatus is shown generally at 2, which includes a MYLAR sheet or film feed station 4, (MYLAR is a registered trademark of E. I. Du Pont de Nemours) which feeds MYLAR sheet onto a support track mechanism 6, which is fixed and guided by a sub-frame member 8. A spray apparatus 10 spans the width of the support track mechanism 6 and includes a spray head 12 as will be described herein. Downstream of the spray apparatus 10 is an oven 14 which is enclosed and extends for some length as depicted in FIGS. 1B and 1C. Downstream of the oven 14 is a first resin-dispensing station 16, which applies a first spray of resin through spray head 18 and a first coating of chopped fiberglass through fiberglass applicator station 20. Downstream of applicator 16 is an automatic roller mechanism 22, which will be described in greater detail herein. As shown in FIG. 1D, a second resin-dispensing station 24 is positioned downstream of the first resin-dispensing station 16 and is substantially identical to first resin-dispensing station 16, including a second resin spray head 26 and a second fiberglass applicator station at 28 (alternatively, the second resin applicator may not be required, depending on the input materials, the physical requirements of the panel, and the capacity of the first resin applicator). Downstream of the second applicator station 24 is a second automatic roller mechanism 30, which is identical to roller mechanism 22. As shown in FIG. 1D, a board loading station is provided at 32, whereby sheets of wood product can be placed above the fiberglass as described further herein. With reference now to FIG. 1E, a pressure roller track is shown at 34, while a MYLAR sheet take-up apparatus is shown at 36. One skilled in the art appreciates the film may comprise other materials than MYLAR, so long as the strength, durability, chemical compatibility, release, and other requirements are met. One skilled in the art further appreciates the chopped glass fibers may alternatively comprise a reinforcement mat, a chopped polymeric, natural or other fiber, or a sheet of other material having the desired characteristics.

Figure 2:
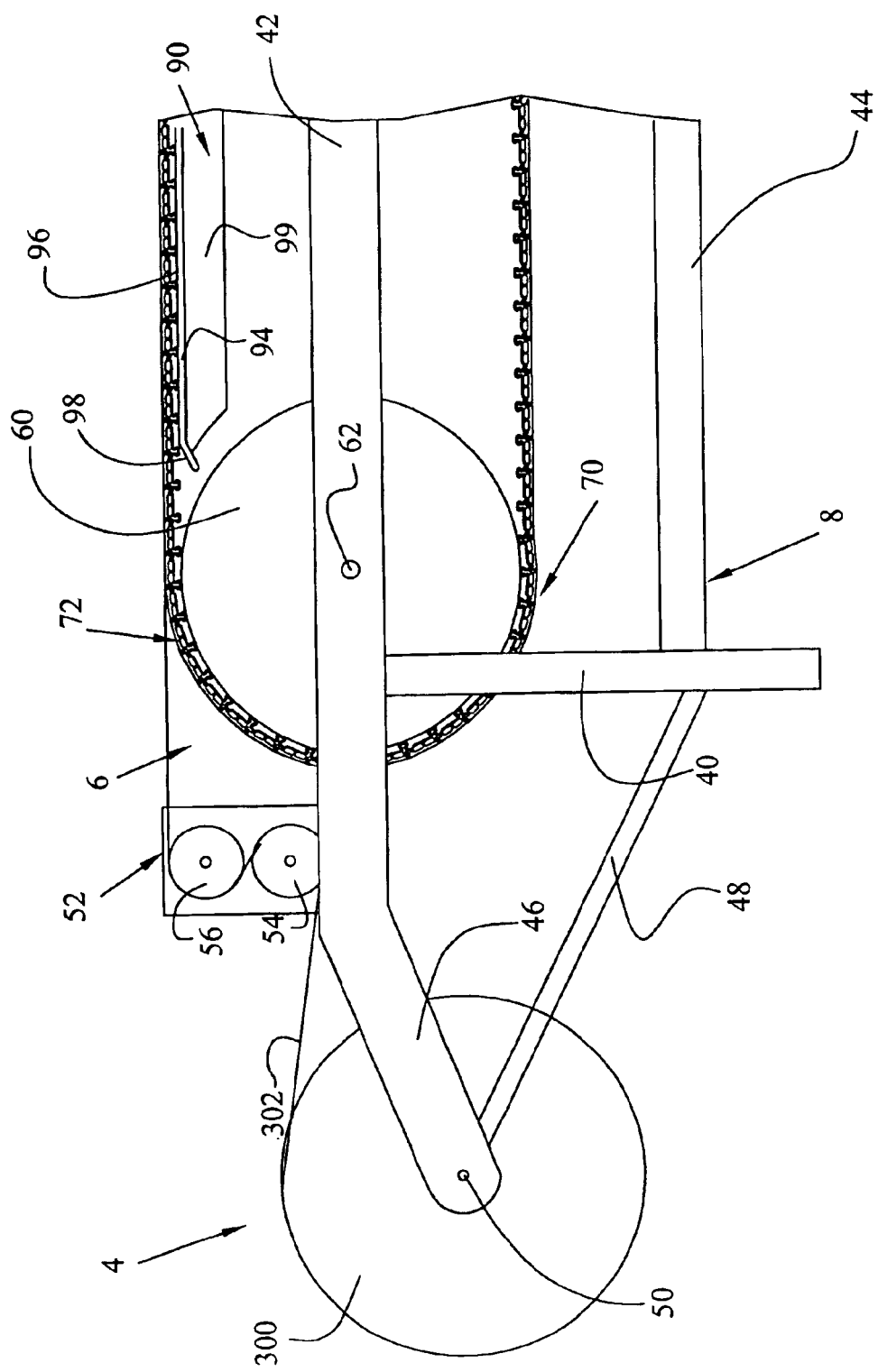
FIG. 2 shows an enlarged view of the mold track and feed section.

With reference now to FIG. 2, the sub-frame 8 is shown as including a plurality of vertical legs 40, together with a plurality of horizontal beams, such as 42 and 44, which form the rigidity for the molding apparatus. As should be appreciated by one skilled in the art, many variations and forms could be provided without varying from the scope of the invention. It is anticipated that such frame members include structurally rigid items, such as steel channels, angle iron or the like, to form a rigid sturdy frame for the molding process. As shown in FIG. 2, the sub-frame further includes a pair of roll mounting arms 46 (only one of which can be viewed in FIG. 2) together with a support rod such as 48. As shown in FIG. 2, arms 46 would include mounting apertures for receiving a rod, such as 50, for mounting a roll as further described herein. Finally, feed station mechanism 4 includes a tension roller mechanism 52 comprising two idler tension rollers 54 and 56.

With reference still to FIG. 2, support track mechanism 6 includes a roller 60, which is pinned to horizontal bar 42 at 62. A chain link mechanism is provided at 70, which extends around roller 60 and around roller 64 (FIG. 1E) positioned at the opposite end of the mechanism 2. As shown best in FIG. 3, chain 70 is formed from a plurality of links 72, which are identical and which fit together at their ends. In a preferred embodiment of the invention, links 72 are extruded from a plastic material and include a body section 74 having an upper finished surface at 76, with a male connection end 78 at one end and a female connection end 80 at the opposite end. The links 72 further include a T-shaped bar 82 extending from a lower surface 84 of the link and which receives a low friction slide 86 having a complementary T-shaped slot 88.

Finally, and with respect still to FIG. 2, the roller guide mechanism 6 further includes a guide rail mechanism 90 comprised of a support portion 92 and an upper slide portion 94, having a slide surface at 96 and a lead-in section at 98. It should be appreciated that the width of each of the links 72 is at least as wide as the width of the panel to be manufactured, that is, at least 8' wide. Thus, the guide mechanism 90 could either be a unitary member, where the upper slide section 94 is continuous for the entire width, with a plurality of integrally formed structural ribs 99 extending laterally therealong. Alternatively, the guide members 90 could be T-shaped members, whereby section 94 forms the horizontal section of the T, and section 99 forms the vertical section of the T. In this way, the members 90 would be positioned laterally across the width of the device, for example, at spacings of 12 inches. It should be understood, however, that the rails 90 extend the entire length of the apparatus 2, and thus a plurality of sections of guide members 90 will be required, regardless of the configuration as mentioned above. However, the upper surface 96 of the guide members 90, when installed, should be polished to form a relatively flat and consistent reference surface, as will be described herein.

With reference again to FIGS. 1A and 1B, while the spray apparatus 10 and oven 14 are relatively conventional items, they will be described in somewhat greater detail for completeness. As mentioned above, the spraying apparatus 10 spans the width of the track links 72 and includes a spray head 12. The spray head also spans transversely across the links 72 and is profiled to discharge a gel coating in a spray pattern and with relatively uniform thickness. Such spray apparatus may be obtained commercially, for example from Magnum Venus of Kent, Wash. As the gel coating requires curing, a curing oven 14 is included downstream of the spray apparatus 10. The oven encloses the individual track members 72 to maintain the inner temperature at a range of approximately 100°–120° F. With reference to FIGS. 1C and 1D, applicators 16 and 24 are also somewhat conventional, and include resin spray heads 18, 26, and fiberglass applicators 20 and 28. It should be appreciated that the applicators 20 and 28 are designed for chopping fiberglass fibers and dispensing them in various sizes to form a composite material as will be described herein. Such chopper and spray apparatus may be obtained commercially, for example from Magnum Venus of Kent, Wash.

Figure 4:
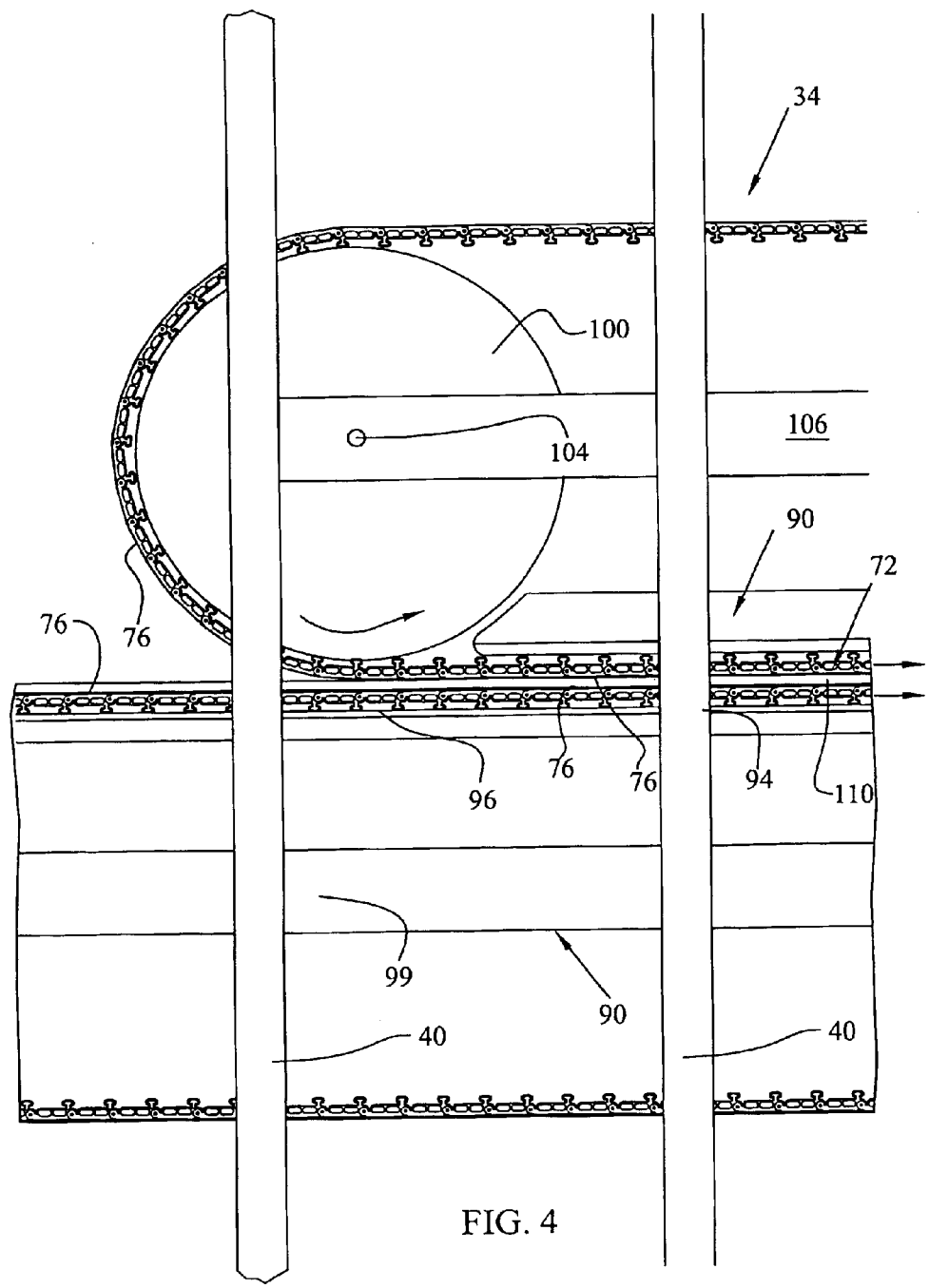
FIG. 4 shows an enlarged view of the pressure track.

As shown in FIGS. 1E and 4, a pressure roller mechanism 34 is shown, which is substantially similar to roller mechanism 6, and includes track links 72, which are identical to that described above, and are linked around rollers 100, 102 as shown in FIGS. 1E and 4. Roller 100 is pinned at 104 to cross bar 106 fixing the rollers in a spaced relation as shown in FIG. 1E. The pressure roller mechanism 34 may also optionally include a guide mechanism 90 identical to that described with reference to FIG. 2, yet inverted as shown in FIG. 4. As also shown in FIG. 4, it should be appreciated that the tracks are positioned such that a gap 110 is formed between opposing surfaces 96 of the links 72.

With respect again to FIG. 1E, take-up roller mechanism 36 includes arms 146 and tension roller mechanism 152, which are directly analogous to arms 46 and tension roller mechanism 52 as should be appreciated by those skilled in the art.

Figure 5:
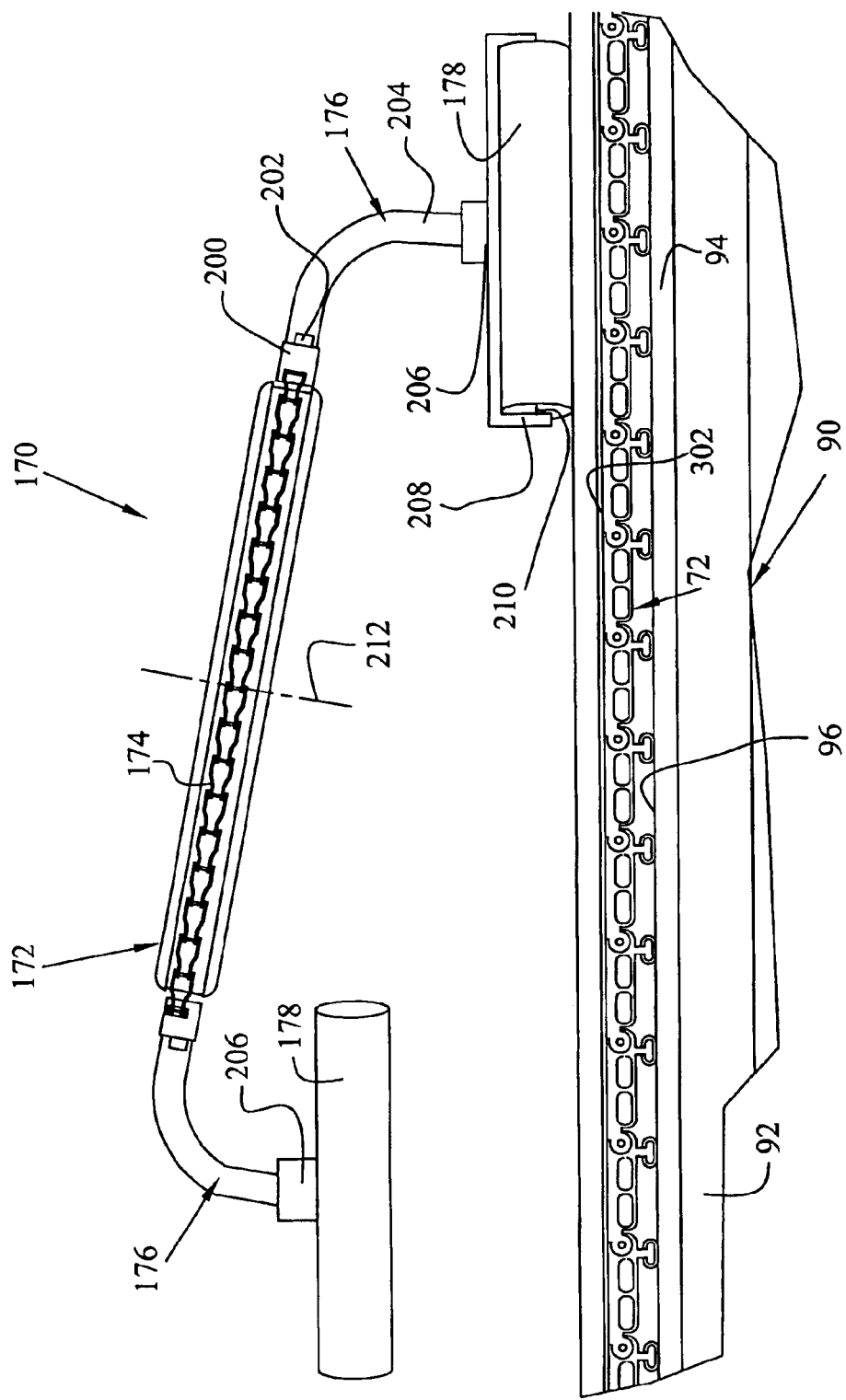
FIG. 5 shows an end view of the fiberglass roller mechanism.
Figure 6A:
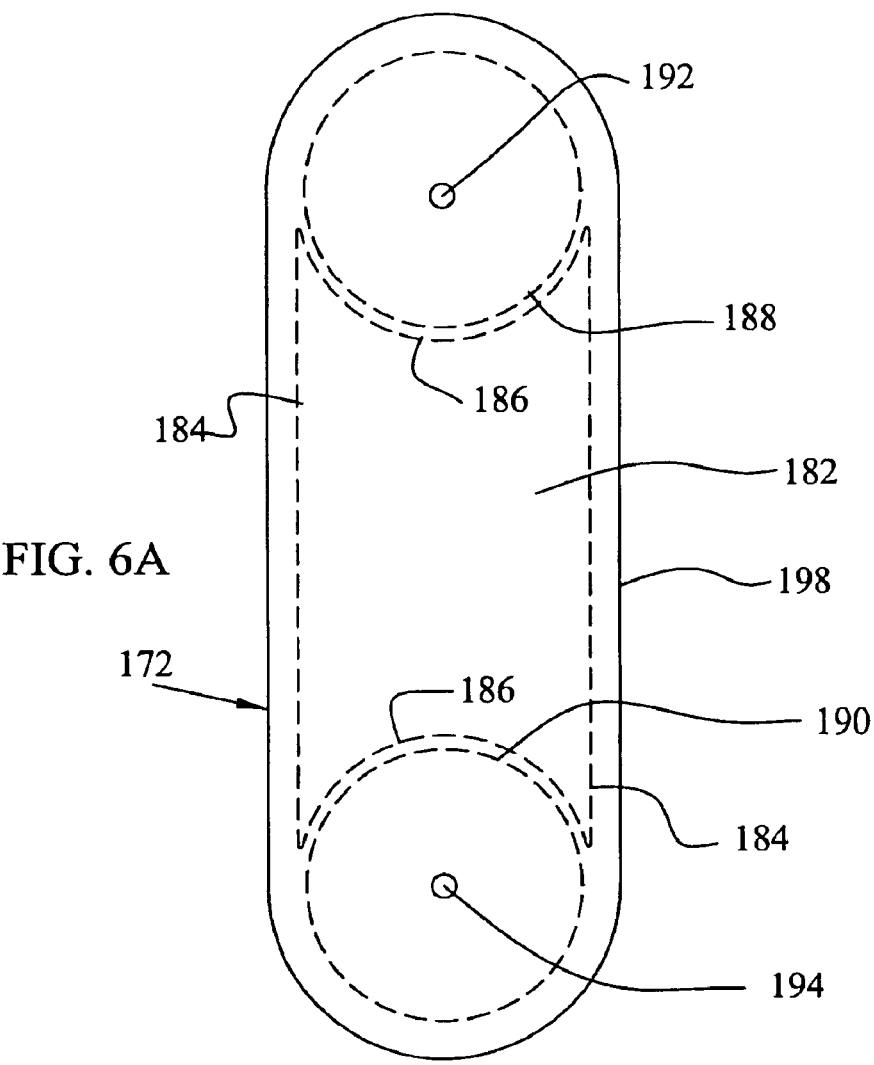
FIGS. 6A shows a top plan view of the chain guide mechanism of FIG. 5.
Figure 6B:
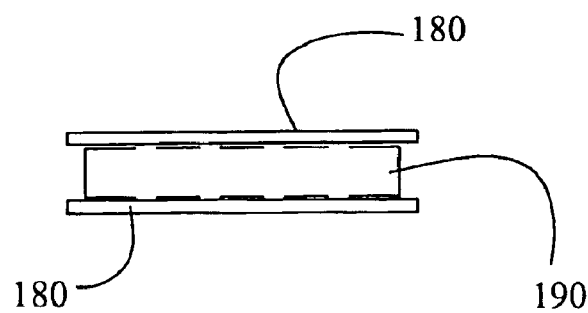
FIG. 6B shows an end view of the chain guide mechanism of FIG. 6A.

With respect now to FIGS. 1C and 1D, the molding apparatus includes automatic roller mechanisms 170, which are adjustable given the speed of the apparatus, and which are adjustable to accommodate different speeds. With reference now to FIGS. 5, 6A and 6B, the roller mechanism 170 will be described in greater detail. As shown first in FIG. 5, roller mechanism 170 includes a chain drive mechanism 172, a chain link 174, and a plurality of mounting arms 176, which mount a like plurality of rollers 178. As shown in FIGS. 6A and 6B, chain guide mechanism 172 includes top and bottom plates 180 spaced apart by a spacer member 182 having side edges 184 and arcuate end faces 186. The mechanism 172 further includes first and second sprockets 188 and 190, which are pinned at 192 and 194 to plates 180. It should be appreciated from FIG. 6B that the thickness of the spacer plate 182 is greater than the sprocket thickness, such that clearance is formed intermediate the plates 180 to allow sprockets 188, 190 to rotate therein. It should also be appreciated that the arcuate end faces 186 form arcuate pockets to receive the sprockets 188 and 190. With reference again to FIG. 6A, it should also be appreciated that the side edges 184 of the spacer plate 182 are recessed within the spacer plates 180 so as to form a recess 198 for receiving chain link 174.

With respect again to FIG. 5, mounting arms 176 include flange portions 200, which are connectable to chain link 174 by fasteners such as 202. Rollers 178 are also interconnected to rod ends 204 by way of a pivot joint at 206. It should be understood that rods 204 extend in a generally vertical sense, and rollers 178 are attached to rods 204 at a substantially perpendicular angle relative thereto, while pivot joints 206 allow rollers 178 to be mounted to arms 204 in various fixed rotational positions as will be described herein. The rollers 178 are held to pivot joints 206 by way of laterally extending arms 208 and axle 210. As shown in FIG. 5, the roller mechanism is installed such that chain drive mechanism 172 is at a slight angle relative to horizontal, that is, on center line 212.

Figure 3:
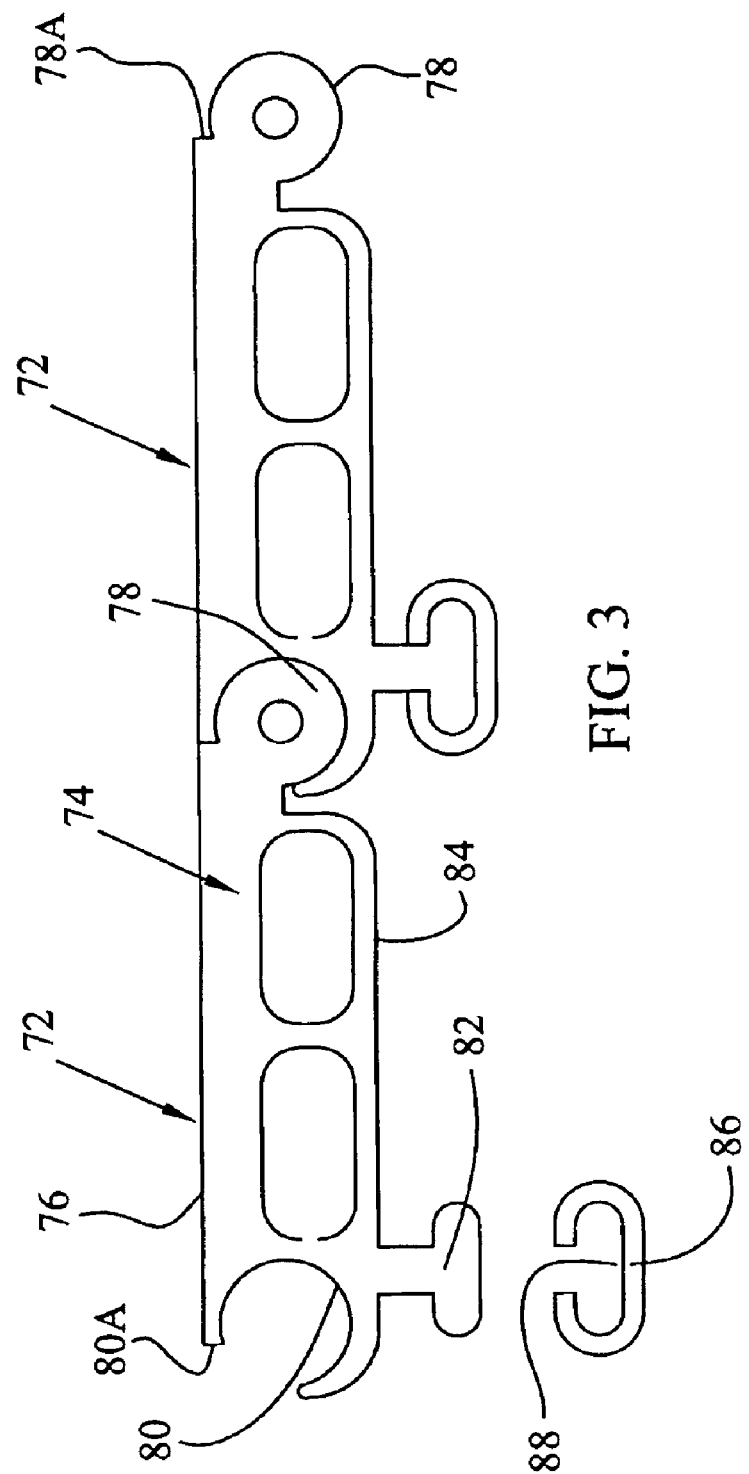
FIG. 3 shows an enlarged view of the mold track links.

With respect to the drawing figures, the assembly of the apparatus will now be described. As mentioned above, the sub-frame of the device is comprised of a plurality of horizontal beams 42 and 44 together with vertical legs 40. It should be appreciated that this frame member is assembled in an elongate fashion so as to provide rigid support for the support track mechanism 6. The individual rollers 60 and 64 (FIGS. 2 and 1E) are positioned to horizontal beam 42. The plurality of guide members 90 are now positioned relative to the sub-frame 8, such that slide surface 96 forms a substantially horizontal reference surface. Once the reference surface is established, the individual links 72 (FIG. 3) are connected together and fed around rollers 60 and 64. As shown in FIG. 3, the low friction slides 86 are also slidably received by way of the T-slot 88 slidably received over the T-shaped bar 82, and the completed chain is positioned around both rollers 60 and 64 so as to form a closed loop. As shown in FIG. 2, this positions the low friction slides 86 on top of the slide surface 96 in a sliding relation thereto. It should be appreciated that the complementary surfaces 78A and 80A, FIG. 3, are profiled such that the links form together a uniform horizontal surface defined by the upper surfaces 76 of the links 72, and the cooperating surfaces 78A and 80A form a closed gap without a raised edge.

With reference now to FIG. 4, the pressure roller track 34 is now installed in a similar manner as that described with relation to the drive roller 6, by mounting rollers 100 and 102 to horizontal cross bar 106. The links 72 and slide 90 are positioned in a similar manner as that described above, while at the same time it should be appreciated that rollers 100, 102 should be vertically adjustable so as to adjust the gap distance 110.

The manufacture of composite wall board will now be described. With reference first to FIG. 2, a MYLAR roll 300 is installed intermediate arms 46, with an individual sheet 302 of the roll being fed around tension rollers 54, 56 and thereafter placed over the top of links 72. The MYLAR sheet continues to be fed through oven 14, as well as through first and second applicators 16, 24, and under rolling stations 22, 30. The MYLAR sheet 302 is then fed through tension roller mechanism 152 and finally to a take-up roll 304 (FIG. 1E). It should be appreciated that take-up roll 304 may now be driven simultaneously with rollers 60, 64, whereby MYLAR sheet moves from the left to right as viewed in FIG. 1A, whereby the MYLAR sheet is supported in a perfectly planar manner by the plurality of links 72, which move with the MYLAR sheet at the same speed.

With reference now to FIG. 1A, the process may begin by activating spray apparatus 10 such that a gel coat material is sprayed on top of the MYLAR sheet as it passes beneath the spray apparatus 10. The MYLAR sheet, together with the film of gel coating, now progresses through oven 14, whereby the gel coating is substantially cured. As the MYLAR sheet together with the gel coated film exits the oven 14 as shown in FIG. 1C, a resin is sprayed on top of the gel coating through resin spray head 18 and thereafter fiberglass strands are dropped on top of the resin film. Roller mechanism 170 is now operated such that the plurality of individual rollers 178 roll the fiberglass strands into the resin to remove pockets of air from the fiberglass to form a suitable bond with the resin. As shown in FIG. 5, the roller mechanism 170 should be adjusted vertically such that the weight of the rollers alone is pressed against the composite of gel coating, resin and fiberglass strands, and the chain 174 is driven by one of the sprockets 188 or 190 so as to move the rollers 178. The design of the roller mechanism 170 not only provides for uniform rolling of the fiber strands into the resin, but the roller mechanism allows the rollers 178 to move relative to, and at the identical speed of, the MYLAR film, as described with reference to FIGS. 7A and 7B.

Figure 7A:
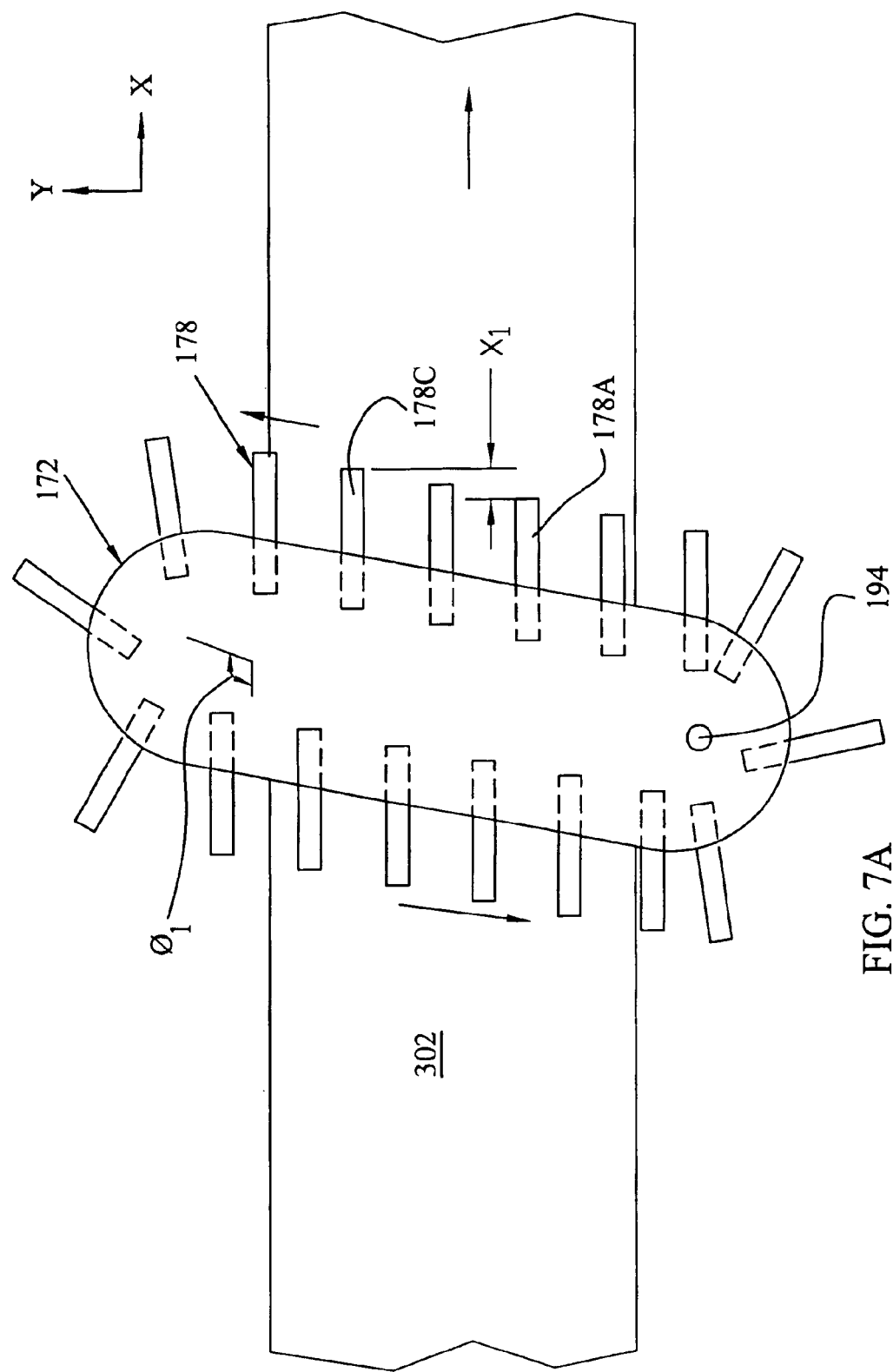

With reference first to FIG. 7A, chain guide 172 is shown as being positioned at an angle $\Phi_1$ relative to MYLAR film 302, which passes therebeneath. Thus, as the rollers 178 move in the direction of the arrows, rollers 178 move in a transverse direction relative to the movement of the MYLAR film 302. As the chain guide 172 is mounted at an angle relative to MYLAR film 302, as shown in FIG. 7A, the movement of rollers 178 includes displacement components in both the X and Y directions. Said differently, and with reference still to FIG. 7A, angle $\Phi_1$ is chosen together with the speed of the chain, such that during the time that roller 178A moves to position 178C, its displacement is $X_1$. Therefore, the displacement of the MYLAR sheet during that same time period would also move a distance $X_1$. This prevents the dragging of the rollers, or the relative movement of the rollers in relation to the MYLAR film. In the event that the MYLAR film needs to operate at a higher speed, the chain guide 172 could be configured as shown in FIG. 7B mounted at angle $\Phi_2$ relative to MYLAR film 302. Thus, in this manner, movement of the rollers 178 from the position 178A to the 178C position causes a displacement in the X direction of $X_2$, which is substantially larger than $X_1$. With reference again to FIG. 5, the chain guide 172 is also mounted at a tilt angle 210, which causes rollers 178 to roll on one side thereof, but when the rollers move beyond the edge of the MYLAR film 302, they are lifted and carried over the top of the MYLAR film.

It should be appreciated that after MYLAR film 302 passes beneath the second roller station 30, the MYLAR film enters area 302, where an operator can lay the individual panels of wood sheets in a side-by-side manner. As mentioned above, these sheets are typically referred to as luan, and exist in 1.2×2.4 meter (4 ft.×8 ft.) sheets. Thus, the 2.4 m (8') length would correspond with the 2.4 m (8') width of the MYLAR film, whereby the panels are abutted together along their side edges. Normally a strip of webbing is placed along the seams of the luan sheets, and the combination of the MYLAR film, the gel coating, the resin, the fiberglass strands, and the luan sheets would now pass under the pressure roller section 34, whereby links 72 would press against that composite. Depending upon the pressure required, the weight of the links 72 alone may be adequate, while in other instances, it may be required to lower the rail 90 so as to increase the pressure between the opposed links 72. In any event, it should be appreciated that both the links 72 of the pressure mechanism 34, the links 72 of the roller drive mechanism 6, as well as the MYLAR film 302, are moving at the identical speed. As shown in FIG. 1E, the MYLAR film 302 is taken up in roller 304, whereby the composite sheet would be fed onto a roller table 320 in a continuous fashion. It should be appreciated that the continuous sheet could then be cut at downstream locations to any size desired. Furthermore, a continuous reinforcement backing may be provided, so the seams of the lauan product are eliminated. Such a backing may comprise a composite sheet, polymer sheet, foam, coiled steel or aluminum, or other backing having the desired properties for a particular application.

Advantageously then, the above-mentioned method and apparatus eliminate the requirement for molds at all, as well as their maintenance. Rather, the above-described apparatus utilizes MYLAR film as the mold surface rather than an elongate mold as described in the prior art. Furthermore, as the sheet which projects onto roller table 320 is continuous, any length of sheet is possible without having scrap lengths to discard.

What is claimed is:

1. An apparatus for manufacturing fiber-reinforced sheet, comprising:
   a continuous mold surface being arranged in a longitudinal manner, onto which the fiber-reinforced sheet may be formed;
   a spray mechanism to spray a first outer coat of material onto said mold surface;
   at least one dispensing mechanism to dispense resin over said first outer coat;
   at least one applicator mechanism to apply fiber strands over said first outer coat; and
   a roller mechanism for rolling said fiber strands and said resin.

2. An apparatus according to claim 1, wherein said continuous mold surface comprises:
   an upper movable surface being arranged in a longitudinal manner; and
   a feed mechanism to continuously feed sheet onto said upper movable surface.

3. An apparatus according to claim 2, further comprising:
   a loading area whereby sheet panels may be positioned over said rolled fibers and resin; and
   a mechanism to draw said resin into said sheet panels to form a rigid composite material.

4. The apparatus of claim 3, wherein said drawing mechanism is a pressure application mechanism.

5. The apparatus of claim 4, wherein said pressure mechanism is comprised of a continuous loop of individual links positioned in a spaced apart position from said upper movable surface.

6. The apparatus of claim 2, wherein said sheet is comprised of a roll of sheet material of high tensile strength.

7. The apparatus of claim 1, wherein said applicator mechanism comprises a chopper for applying fibrous reinforcement.

8. An apparatus according to claim 1, wherein said roller mechanism comprises an automatic roller mechanism which performs transverse rolling patterns across said mold surface.

9. An apparatus for manufacturing fiber-reinforced sheet, comprising:
   a continuous mold surface being arranged in a longitudinal manner, onto which the fiber-reinforced sheet may be formed said mold surface being movable in a longitudinal direction;
   a spray mechanism to spray a first outer coat of material onto said mold surface;
   at least one dispensing mechanism to dispense resin over said first outer coat; at least one applicator mechanism to apply fiber strands over said first outer coat; and a roller mechanism for rolling said fiber strands and said resin, said roller mechanism comprising an automatic roller mechanism which mechanism transverse rolling patterns across said mold surface, said automatic roller mechanism being comprised of at least one roller which is driven in a continuous loop in a direction transverse to said longitudinal direction.

10. The apparatus of claim 9, wherein said roller mechanism is comprised of a driven chain loop guided around a chain guide, and said roller is attached to and driven by chain loop.

11. The apparatus of claim 10, further comprising a movable support surface positioned beneath said movable mold surface.

12. The apparatus of claim 11, wherein said movable mold surface and said movable support surface are moved together at substantially the same speeds.

13. The apparatus of claim 12, wherein said movable support surface is defined by a continuous loop of individual links.

14. The apparatus of claim 13, wherein said apparatus further comprises a rail member positioned blow said links defining a reference surface, and said links have a lower foot portion which registers with said links to define a horizontal plane.

15. The apparatus of claim 10, wherein said movable mold surface is defined by a roll of film together with a feed mechanism to feed said film at a first end, and a take up roller at a second end.

16. The apparatus of claim 10, wherein said chain guide is movable to various angles to vary the angle of the chain guide relative to the longitudinal direction.

17. The apparatus of claim 16, wherein a plan, of said chain guide is tipped relative to a plane of said mold surface.

18. The apparatus of claim 16, further comprising a plurality of rollers attached to and driven by said chain loop.

19. The apparatus of claim 9, wherein said roller mechanism is profiled to move said at least one roller in a direction, such that die roller has a transverse velocity component and a longitudinal velocity component, whereby the longitudinal velocity component is equal to a longitudinal velocity of the moving mold surface.

20. An apparatus for manufacturing fiber-reinforced sheet, comprising:
a continuous mold surface being arranged in a longitudinal manner onto which the fiber-reinforced sheet may be formed said continuous mold surface being defined by a continuous loop of individual links;
a spray mechanism to spray a first outer coat of material onto said mold surface;
at least one dispensing mechanism to dispense resin over first outer coat;
at least one applicator mechanism to apply fiber strands over said first outer coat; and
a roller mechanism for rolling said fiber strands and said resin.

21. The apparatus of claim 20, wherein said links are elongate in width and connect to adjacent links along their front and rear edges.

22. The apparatus of claim 21, wherein said apparatus further comprises a rail member positioned below said links defining a reference surface, and said links have a lower foot portion which registers with said links to define a horizontal plane, on said upper movable surface.

23. The apparatus of claim 22, wherein said foot portion has a wear bar comprised of a low friction surface which slides relative to said reference surface.

24. An apparatus for manufacturing fiber-reinforced sheet, comprising:
a continuous mold surface being arranged in a longitudinal manner onto which the fiber-reinforced sheet may be formed, said continuous mold surface comprising an upper movable surface being arranged in a longitudinal manner and a feed mechanism to continuously feed sheet onto said upper movable surface and a take up roller to roll up said sheet material, said sheet being comprised of a roll of sheet material of high tensile strength;
a spray mechanism to spray a first outer coat of material onto said mold surface;
at least one dispensing mechanism to dispense resin over said first outer coat;
at least one applicator mechanism to apply fiber strands over said first outer coat; and a roller mechanism for rolling said fiber strands and said resin.

25. The apparatus of claim 24, further comprising a roller table adjacent said take up roller, whereby finished fiberglass-reinforced sheet may be continuously fed onto said roller table.

26. The apparatus of claim 25, wherein said reinforcement applicator mechanism comprises a chopper for applying fibrous reinforcement.

* * * * *

UNITED STATES PATENT AND TRADEMARK OFFICE
CERTIFICATE OF CORRECTION

PATENT NO. : 6,854,499 B2
DATED : February 15, 2005
INVENTOR(S) : Miller

It is certified that error appears in the above-identified patent and that said Letters Patent is hereby corrected as shown below:

<u>Column 8,</u>
Line 59, "mechanism" should read -- performs --

<u>Column 9,</u>
Line 22, "plan" should read -- plane --
Line 28, "die" should read -- the --

Signed and Sealed this

Third Day of May, 2005

JON W. DUDAS
*Director of the United States Patent and Trademark Office*